United States Patent
Crow et al.

(10) Patent No.: US 7,353,295 B1
(45) Date of Patent: Apr. 1, 2008

(54) DISTRIBUTED SERVICES ARCHITECTURE THROUGH USE OF A DYNAMIC SERVICE POINT MAP

(75) Inventors: James J. Crow, Austin, TX (US); Dennis L. Parker, Leander, TX (US)

(73) Assignee: Motive, Inc., Austin, TX (US)

( * ) Notice: Subject to any disclaimer, the term of this patent is extended or adjusted under 35 U.S.C. 154(b) by 0 days.

(21) Appl. No.: 09/542,273

(22) Filed: Apr. 4, 2000

(51) Int. Cl.
G06F 15/16 (2006.01)

(52) U.S. Cl. ............ 709/245; 709/201; 709/217; 709/220; 709/229; 707/102; 370/359

(58) Field of Classification Search ......... 709/244, 709/200–203, 217, 220; 370/359; 707/102
See application file for complete search history.

(56) References Cited

U.S. PATENT DOCUMENTS

| | | | |
|---|---|---|---|
| 5,852,722 A | 12/1998 | Hamilton | 395/200.51 |
| 5,901,352 A | 5/1999 | St-Pierre et al. | 455/426 |
| 5,933,646 A | 8/1999 | Hendrickson et al. | 395/712 |
| 5,951,694 A * | 9/1999 | Choquier et al. | 714/15 |
| 6,058,425 A * | 5/2000 | White | 709/227 |
| 6,067,568 A | 5/2000 | Li et al. | 709/223 |
| 6,078,960 A * | 6/2000 | Ballard | 709/229 |
| 6,085,120 A | 7/2000 | Schwerdtfeger et al. | 700/90 |
| 6,128,293 A * | 10/2000 | Pfeffer | 370/359 |
| 6,173,326 B1 | 1/2001 | Collins | 709/229 |
| 6,188,888 B1 * | 2/2001 | Bartle et al. | 455/417 |
| 6,199,104 B1 | 3/2001 | Delph | 709/208 |
| 6,209,125 B1 | 3/2001 | Hamilton et al. | 717/4 |
| 6,215,855 B1 | 4/2001 | Schneider | 379/22 |
| 6,237,135 B1 | 5/2001 | Timbol | 717/1 |
| 6,249,578 B1 | 6/2001 | Gilles et al. | 379/221 |
| 6,256,772 B1 | 7/2001 | Apte et al. | 717/1 |
| 6,279,125 B1 | 8/2001 | Klein | 714/38 |
| 6,285,983 B1 | 9/2001 | Jenkins | 705/10 |
| 6,289,381 B1 | 9/2001 | Brodigan | 709/225 |
| 6,298,353 B1 | 10/2001 | Apte | 707/103 |
| 6,324,619 B1 | 11/2001 | Raverdy et al. | 711/11 |
| 6,330,006 B1 | 12/2001 | Goodisman | 345/762 |

(Continued)

FOREIGN PATENT DOCUMENTS

JP 02001117932 A * 4/2001

(Continued)

OTHER PUBLICATIONS

Welcome to AOL.com, web.archive.org/web/19981201225748/aol. com/, © 1998 America Online, Inc., 2 pages (printed Dec. 1, 2003).

(Continued)

*Primary Examiner*—Jeffrey Pwu
*Assistant Examiner*—Liang-che Alex Wang
(74) *Attorney, Agent, or Firm*—Campbell Stephenson LLP

(57) ABSTRACT

An information management system within a client/server based computer system is disclosed. The information management system manages information as to the dynamic locations and continuous changes relating to services offered within the computer system. The information management system utilizes a service point map (SPM) that monitors such changes. The SPM tracks changes relating to services, sphere, location, port, and epoch value. The SPM may be hierarchical in nature. Parallel or duplicate services may also exist within the system.

24 Claims, 4 Drawing Sheets

U.S. PATENT DOCUMENTS

| | | | |
|---|---|---|---|
| 6,381,742 B2 | 4/2002 | Forbes et al. | 717/11 |
| 6,438,744 B2 | 8/2002 | Toutonghi et al. | 717/137 |
| 6,459,773 B1 | 10/2002 | Posthuma | 379/1.04 |
| 6,463,078 B1 | 10/2002 | Engstrom et al. | 370/466 |
| 6,463,079 B2 | 10/2002 | Sundaresan et al. | 370/468 |
| 6,463,578 B1 | 10/2002 | Johnson | 717/124 |
| 6,470,074 B2 | 10/2002 | Teixeria | 379/32.04 |
| 6,473,791 B1 * | 10/2002 | Al-Ghosein et al. | 709/217 |
| 6,477,580 B1 | 11/2002 | Bowman-Amuah | 709/231 |
| 6,487,557 B1 * | 11/2002 | Nagatomo | 707/102 |
| 6,490,722 B1 | 12/2002 | Barton et al. | 717/174 |
| 6,529,511 B1 | 3/2003 | Du et al. | 370/397 |
| 6,560,213 B1 | 5/2003 | Izadpanah et al. | 370/338 |
| 6,560,704 B2 | 5/2003 | Dieterman et al. | 713/100 |
| 6,564,377 B1 | 5/2003 | Jayasimha et al. | 717/174 |
| 6,636,329 B2 | 10/2003 | Koppich et al. | 358/1.15 |
| 6,636,505 B1 | 10/2003 | Wang et al. | 370/352 |
| 6,640,239 B1 | 10/2003 | Gidwani | 709/203 |
| 6,684,242 B1 | 1/2004 | Bahlmann | 709/222 |
| 6,704,927 B1 | 3/2004 | Bak et al. | 717/151 |
| 6,779,039 B1 * | 8/2004 | Bommareddy et al. | 709/238 |
| 2001/0020249 A1 | 9/2001 | Shim | 709/220 |
| 2002/0095400 A1 | 7/2002 | Johnson et al. | 707/1 |
| 2002/0133573 A1 * | 9/2002 | Matsuda et al. | 709/220 |

FOREIGN PATENT DOCUMENTS

WO     WO 9903036 A1 *   1/1999

OTHER PUBLICATIONS

America Online Software Version 5.0 Screenshots, 8 pages, no date.

* cited by examiner

DISTRIBUTED SERVICES ARCHITECTURE THROUGH USE OF A DYNAMIC SERVICE POINT MAP

INCORPORATION BY REFERENCE

The following applications are hereby incorporated herein by reference in their entirety and made part of the present application:
 (1) U.S. patent application Ser. No. 09/542,602, filed concurrently herewith; and
 (2) U.S. patent application Ser. No. 09/542,274, filed concurrently herewith.

BACKGROUND

1. Technical Field

The present invention relates to the field of computer systems. In one aspect, the present invention relates to the dynamic management of system resources in a distributed computer network environment.

2. Description of Related Art

In conventional computer network applications, particularly telecommunication networks (e.g., the Internet), it is common for an application running at a particular computer to interact with or use another application that may be located at the same computer or at a different computer connected to the network. In addition, technology in the computer area is subject to rapid change, both in the hardware and software technologies that are continually introduced. As a consequence, computer applications in a network environment are often faced with changes in the network environment, whether they be changes in software applications used by a program or changes in hardware (including changing the machines or connections used to run services in the network environment). The challenge of adapting to new technologies resides not only with the end user or client side, but also with the network service provider. For example, an Internet Service Provider ("ISP") experiences changes in the hardware and software technologies that must be supported, in the expectations of the subscribers, and in the need for service enhancements to respond to competitive pressures.

Where the number of resource users (e.g., clients) are unpredictable, it can adversely affect the performance of the resource (e.g., servers). In addition, where the locations of clients, servers and/or services to change over time, it becomes relatively difficult for clients to access services after relocation of such services within a conventional client/server based 110 computer system. The addition of new services also presents challenges of notifying clients of their availability. Likewise, the large volume and unpredictable nature of the client activity within a network can compound such problems. Conventional client/server based computer systems are unable to track the dynamic location and relocation of services both externally and within the computer system. In view of the foregoing, managing distributed state is a particular challenge to this imperative, since the services need to be able to rely on certain facts about the client state, but also need to avoid the overhead of storing per-client state at the service end.

Further limitations and disadvantages of conventional systems will become apparent to one of skill in the art after reviewing the remainder of the present application with reference to the drawings and detailed description which follow.

SUMMARY OF THE INVENTION

In a distributed computer network, resources are dynamically assigned to users through use of a dynamically updated service point map which controls the assignment of resources to users by transmitting resource location information to users (e.g., client machines) that specifies the location of individual resources (e.g., service machines) within the network. The service point map identifies services by location. The information management system also employs an SPM (Service Point Manager) manager machine that manages the physical locations of clients within the network. The service point map also contains information that categorizes the service's sphere of influence. Multiple forms of the SPM may also be defined to add efficiency to the process of grouping and communicating service availability.

In accordance with the invention, a communication network is provided including a plurality of server devices for providing a services to the network, where each service has a corresponding service address in the network. In addition, client devices are provided that that access services by first accessing a service point map listing of services available on the network and corresponding address information for each service. In addition, the communication network may include a service point map manager device to intermittently generate a current service point map identifying the services and corresponding address information for services connected to the network. In operation, each server device sends corresponding address information for each service to the service point map manager device and each client device collects a service point map from the service point map manager device when the client connects to the network. The service point map manager device can select services and corresponding service address information for inclusion in the service point map based on rules such as server load balancing techniques or other discriminators. One example of a load balancing technique is to supply an SPM to the client that has already been processed for load balancing, removing all entries except the "target" for the client. Another example is to supply an SPM to the client that contains all possible entries, where the entries for those services which need load balancing contain script code in the service specific data field, which the client runs in order to select the appropriate entry. Yet another example is for the service point map manager device to select services and corresponding service address information for inclusion in the service point map based on the topographical location of the client device in the network.

In addition, the service point map can include supplemental service identification data in the form of an epoch value for each service identified in the service point map that is used to correlate the performance of the client device and the requested service. In response to detection of mismatch between the epoch value at the client device and the epoch value at the server for its service, the services may cause clients to take corrective action or arbitrary connection arbitration actions. Such actions may be specified via an arbitrary section of executable commands embedded in the SPM entry. In addition, the actions may be combined with epoch number mismatch reply coded actions to produce "fan in" and "fan out" reorganizations of the distribution structure, all with server selection controlled by client implemented behavior. These command segments when executed sequentially in a client comprise a "multiple part, non persistent migrating agent."

The service point map can include backup address information for a selected service identified in the service point map in the event that the selected service cannot be reached. For example, the backup address information can be address information for a service point map manager device, or address information for an alternate server providing the selected service.

In accordance with an alternate embodiment of the present invention, a client/server communication network is provided having services located on a servers connected to the network. A server computer system regularly generates a table listing of services connected to the network and corresponding location information for each listed service, where the table listing is selected from a larger listing of services connected to the network using a first partitioning scheme. Examples of such partitioning schemes include partitioning based on service topology of the network, partitioning the services by resource connection, functional partitioning of services, partitioning of services by equivalency, and so on. Another example of a partitioning scheme is to route services based on the identification data associated with the client computer system, where the client has identification data associated with the client and has requested a table listing from the server computer system. In operation, each client computer system connected to the network collects a table listing of services from the server computer system upon connecting to the network.

In accordance with a still further embodiment of the present invention, a method is provided for giving client process access to services. The services are provided by servers over a computer network using a dynamic service point map. Each client process connects to the computer network. A dynamic service point map is transferred to the client process from a first server device. This dynamic service point map comprises a listing of services and corresponding location information for each of the services. Thereafter, the client process connects to a service listed in the dynamic service point map using the corresponding location information contained in the dynamic service point map. Location information is generated for a server on which a service is provided and is published to the first server device for inclusion in the dynamic service point map. In addition, updated dynamic service point map information is transferred to the client process upon any failure of the client process to properly connect to a service listed in the dynamic service point map.

DETAILED DESCRIPTION OF DRAWINGS

Figure 1:
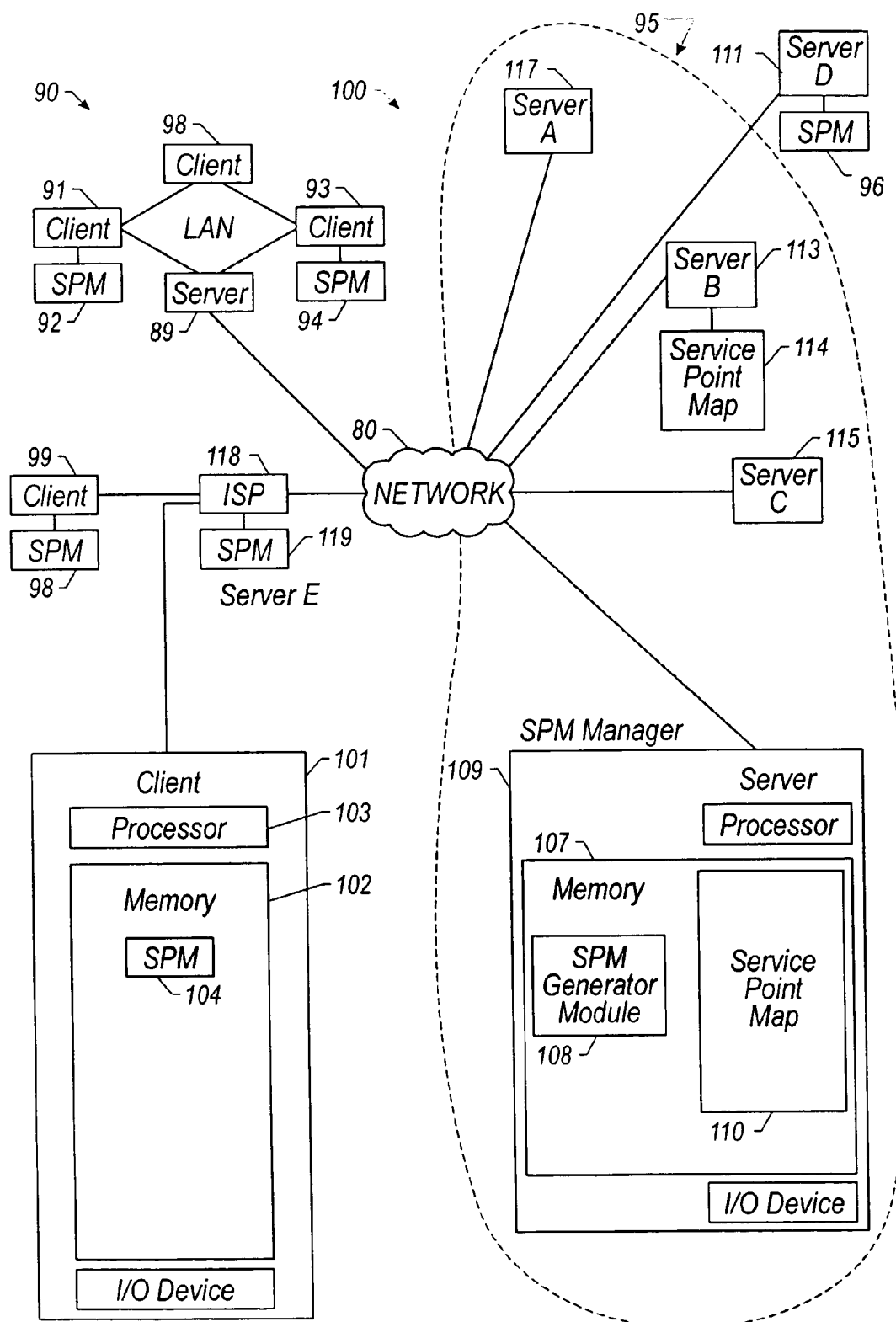
FIG. 1 is an exemplary embodiment of an information management system illustrating a server point map (SPM) functionality according to the present invention that tracks the location and status of services within a client/server based computer system.

FIG. 1 shows an exemplary distributed network environment 100 in which extensible services are dynamically provided to the subscriber/clients 99, 101 through a network 80 using dynamically updated service address information distributed across a framework of standardized interconnection mechanisms (such as described in the co-pending applications referenced above). In such a network, the process of connecting a client 101 to the services it wants to use must satisfy diverse requirements for performance, flexibility, scalability and manageability. From the perspective of the service provider 95 having one or more servers, the flexibility and scalability requirements must be considered foremost, especially on the server side of operations where the number of client requests per task, and the complexity of the tasks themselves, should be simplified. In accordance with the present invention, services can be readily located by clients or other services by using the mapping scheme to convey service address information. While more complex mapping, such as directory structures, may be implemented by the services, these can be avoided at the connection level so as to provide the maximum potential flexibility in deployment architectures. By using the service mapping scheme of the present invention, it is possible for the deployment architecture to change without interrupting service.

In addition, the mapping scheme of the present invention allows for the dynamic addition of new services, whether the service resides at a server machine (e.g., 109), client machine (e.g., 101), ISP (e.g., 118), or elsewhere. In order to avoid unmanageable growth in complexity as new services are added, the present invention may include partitioning of the service map below the top level.

As shown in FIG. 1, the typical user of the distributed services network or extensible service bus ("ESB") is a Service Provider ("ISP") 95 using broadband subscriber connections, although the technology is broadly applicable for use on other sites, including remote servers (e.g., 111) or client machines (e.g., 101). Regardless of where the services reside, it is helpful to think of each of these operating environments as a self-contained functional unit, a "sphere." For example, there is the Service Provider Sphere 95, which includes all the hardware at the service provider's site, and the various Subscriber Spheres (e.g., 91, 93, 99, 101), which include the hardware at the subscriber sites. Additional spheres that might be connected include the Server D 111 hosted by a service provider, such as a computer equipment manufacturer to advertise services or disseminate information relating to the manufacturer's products or services. Most of the subscribers 99, 101 are likely to be individuals, but many will be connecting internal LANs 90 to the Internet 80 via the connection to the server 89. In the latter case, it may be desirable to host some portion of a service on the subscriber's LAN 90. Some of the services that the server 89 wants to offer to the subscriber (e.g., 91) may involve direct connections between services that are not part of the extensible service bus.

Wherever the mapping scheme of the present invention is implemented, a service point map is present at each computer that would require a service offering on the extensible service bus. As seen in FIG. 1, the client spheres that subscribe to the extensible service bus 91, 93, 99, 101 each have a copy of a service point map 92, 94, 98, 104 stored locally. Likewise, any other spheres (e.g., 118) subscribing to the services would also have a map 119 stored locally. Depending on when the SPMs are loaded on the clients, they may or may not be identical to one another at any given time. SPM changes happen when services change their locations, listening ports, epoch numbers, etc. A client may have an out of date copy at any time.

In the exemplary embodiment of an information management system shown in FIG. 1, each subscriber sphere which uses the extensible service bus includes a server point map (SPM) functionality that tracks the location and status of services within a client/server based computer network 100. In an exemplary embodiment, the server point map (SPM) is the basic unit of communication used to notify client machines (e.g., 91, 99, 101) of the location of individual service machines (e.g., 109, 111, 113, 115, 117) within the network 100. The concept of SPM is dynamic and may be tiered to allow extension of basic functionality.

Figure 2:
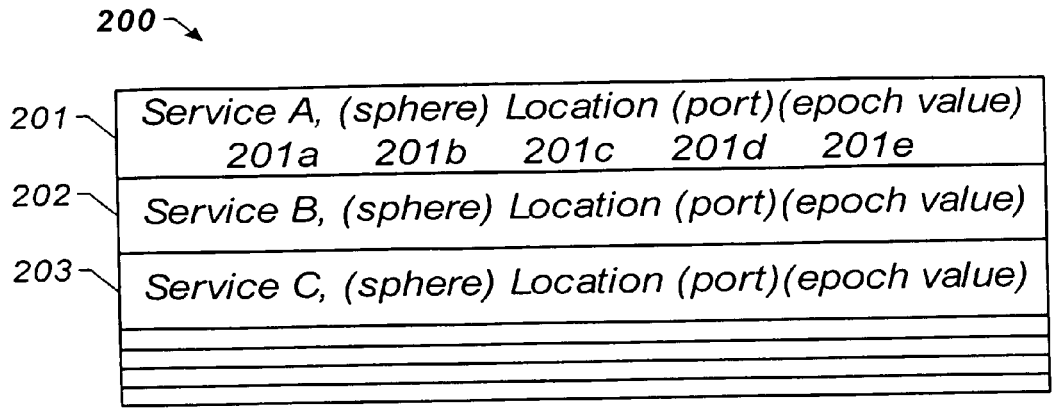
FIG. 2 illustrates a service point map used in one embodiment of the invention.

One embodiment of the service point map of the present invention is shown in FIG. 2, which illustrates a service point map 200 having individual entries 201, 202, 203, etc., each of which corresponds to a particular service offering on the extensible service bus. For example, a first service, "service A," has identification information stored at SPM entry 201 identifying the service by name 201a and location 201c where the service is available. The SPM entry for a service may also include additional service identifier data, such as sphere 201b, port number 201d at the location and epoch value information 201e, described below. Other types of service identification information may also be included in service point map that serve to identify in space and time the location of the service. For example, an entry for a service may indicate a time range over which the location for the service will be valid. Similarly, a service point map may also include two different entries for a particular service, one that is specified to be valid for a first given time range specified in the first entry, and another that is specified to be valid for a second given time range specified in the second entry. Additional forms of service information are possible, since the service specific portion of the SPM entry may include executable commands in a language known to the client. In this way the service may specify arbitrary actions that the client must take in the process of selecting a service.

Each entry (e.g., 201) in an SPM 200 describes a location that provides a service, with details including the name and version of the service and the IP address and port number on which it can be contacted. In one embodiment, the data that appears in the standard SPM entry is separated into a number of items, each of which has sub-items:

| Service Spec | |
|---|---|
| Field Name | Details |
| serviceId | Must be unique, is alpha-numeric |
| serviceVersion | format is x.x, e.g. 1.1, 3.21 etc. |
| Service Sphere | |
| Field Name | Details |
| providerId | Domain name of provider of ESB |
| epoch | Epoch of service at provider |
| Service Host | |
| Field Name | Details |
| inetAddress | Address of service host in INET form |
| dnsAddress | Address of service host in DNS form |
| port | Port number service uses on this host |
| Command/data | Executable command or additional data for use during service location |

The standard form of the map itself adds only a "type" field that specifies which type of map is in use. Type 1 is the standard form. Type 2 is an optimization where the map contains entries for only a single service, and the "service spec" is contained in the table header and omitted from the entries themselves. Type 3 is an optimization where the map contains entries for only a single sphere, and the "service sphere" is contained in the table header and omitted from the entries themselves. Type 4 is an optimization where the map contains entries for only a single service in a single sphere, and the "service spec" and "service sphere" are contained in the table header and omitted from the entries themselves.

There is no architectural limitation on extending the SPM concept deep into a service. In this way, a broadly distributed service might present a single service point in the Level 1 SPM which directs newly connecting clients to a re-director process. This process then provides the clients with a single service type SPM. This method allows a service to do load balancing at the re-director process, in the client, or both.

As referenced above, when services in a distributed network are re-deployed (i.e., moved to another server), service points may be created, modified or deleted after a client loads an SPM. Some services may make relatively weak guarantees about client specific state. For example, a database browser function might provide server side storage of a database browse cursor that cannot survive process termination, so the client needs to be informed when a service point has been restarted. On the other hand, client-to-service connections that do not require server side state information should be able to transparently re-connect to a service point that has been restarted.

The epoch number 201e is the basis for resolving these issues. It is the state information (usually a number stored at the service server and provided to the SPM manager for distribution in SPMs) that is used to delineate changes in the state or deployment of a service point that must be reflected in client operations. For example, if a service that was previously implemented as a single server (with a single service point entry) is administratively changed so that it is run on two servers, then the epoch number for that service changes. If a service that supports weak client state management like that described above is restarted, then the epoch number for that service changes. Conversely, if a service that supports no client state management is restarted, the epoch number need not change. If the epoch number changes, the client would ordinarily drop the connection to the service and acquire a new SPM, then acquire a new connection to the service. This will resolve most epoch number change issues. If more action must be taken at the client in order to resolve this particular change, then the service may supply a set of client commands in the service specific portion of the new SPM entry that the client retrieves. Once the client executes these commands, the epoch change issue is resolved and the client may get a new connection to the service, this time with a matching epoch number.

Figure 3:
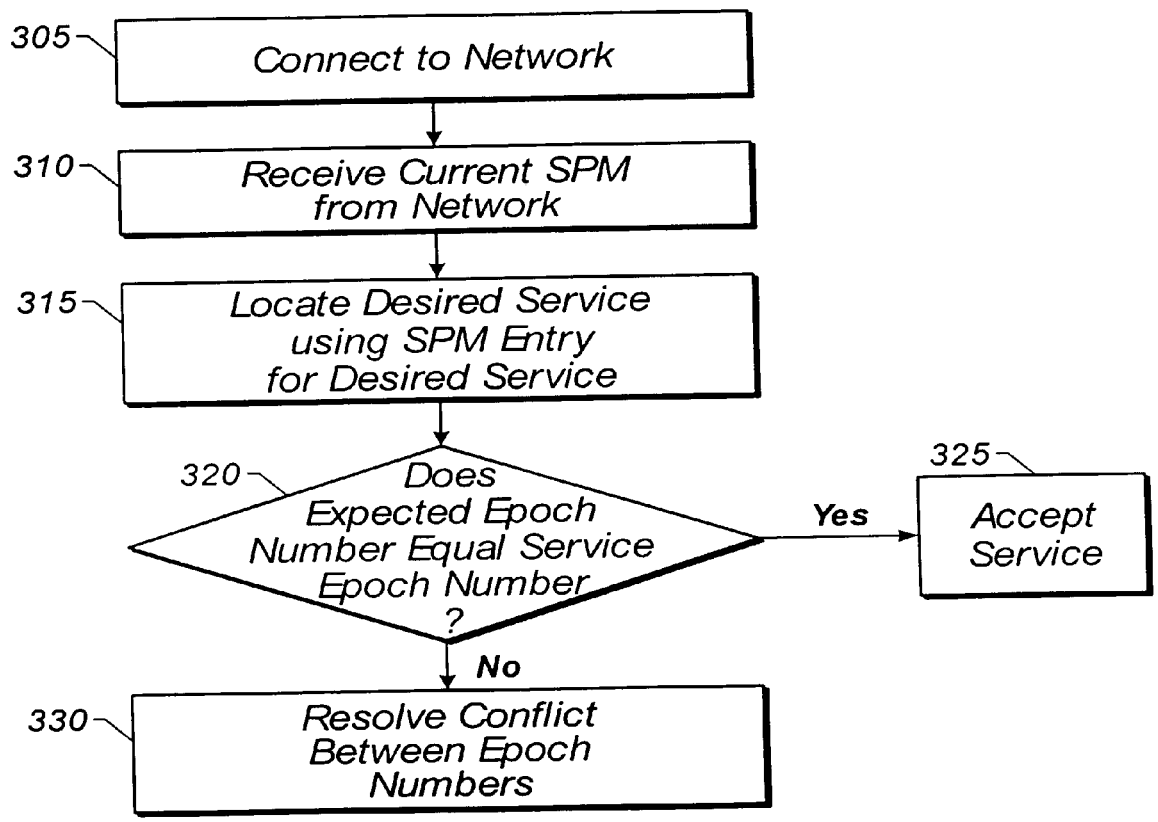
FIG. 3 is an exemplary flow diagram of the information management system according to the present invention, illustrating the procedure utilized to access services within the client/server based computer system.

In a network of distributed computers where a subscriber on one computer (e.g., a client) wishes to use or access the services available on another computer (e.g., a server), the present invention advantageously utilizes the service point map at each "client" computer to identify the location of services in the network. FIG. 3 provides a flowchart diagram illustration of how a client accesses services in the network using the service point map of the present invention. As seen in FIG. 3 and described with reference to the embodiments shown in FIGS. 1 and 4, a client connects to the extensible service bus through any of a variety of ways (step 305). For example, if the client 101 has never connected previously, e.g. it is a new installation for a new subscriber, it contacts a registration service on Server A 117. If it 110 has connected previously, then the saved local state will provide the information it needs to connect to a login service located at Server B 113. Alternatively, any connection attempt could be made to a single common service, such as an SPM manager server 109 which returns a copy of the current Level 1 SPM 110.

Figure 4:
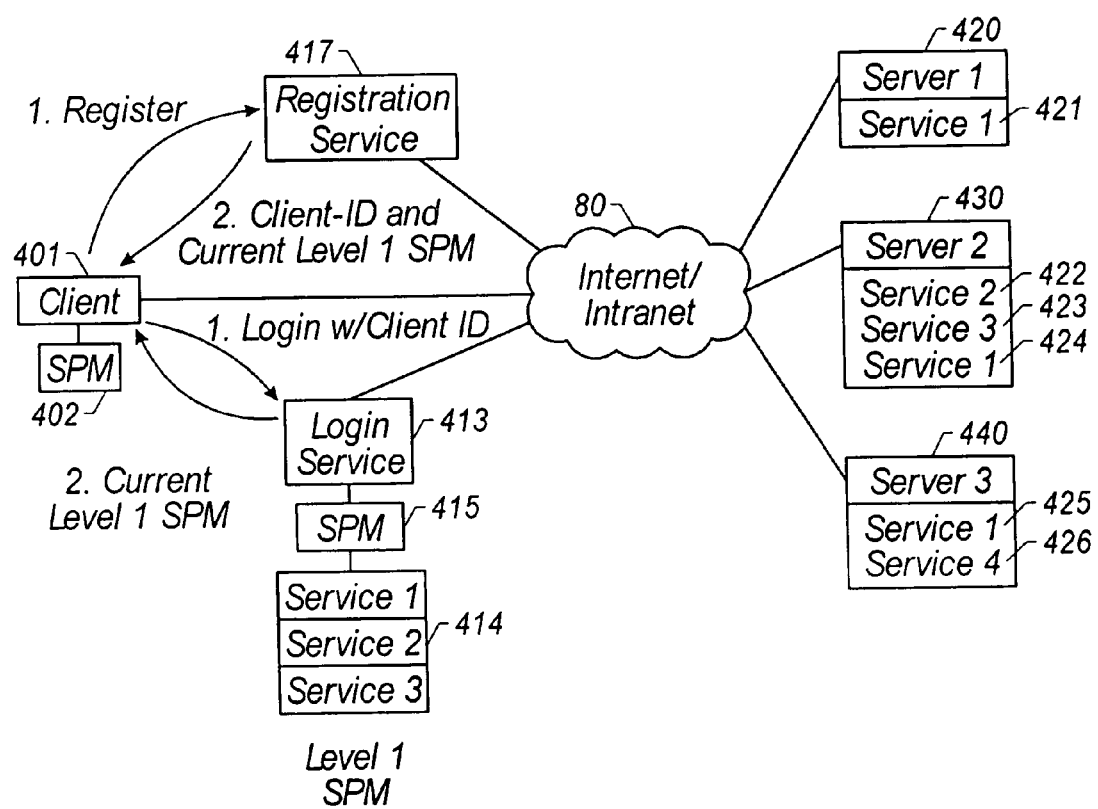
FIG. 4 shows an alternate embodiment of the resource management system utilizing a dynamic service point map in accordance with the present invention.

In accordance with a selected embodiment shown in FIG. 4, when a subscriber 401 is connected to the Internet 80 for the first time, the client process 401 establishes its place in the ESB by contacting the Registration service at server 417 (step 305). The Registration service generates a Client-ID for the new client process. The Client-ID value is unique in time and space, so that multiple Registration servers can implement the Registration service without the need for shared state, thus enabling partitioning by equivalency (discussed below). The Registration service at server 417 then collects a current Level 1 SPM 414 from the Login service at server 413 and supplies this to the client 401 (step 310) for storage as SPM 402. This enables the client 401 to contact the services identified on the SPM 414, effectively completing the connection process (step 315).

If a client 401 had previously registered with the network and received a Client-ID from the Registration service, the client 401 makes all subsequent connections to the ESB by contacting the Login service at server 413 and providing the Client-ID (step 305). The Login service verifies that the Client-ID is valid, and then replies to the client with a copy of the current Level 1 Service Point Map 414 (step 310). The client is then able to connect to other services identified on the SPM 414 (step 315).

In one embodiment of the present invention, clients (e.g., 99) include the epoch number in the requests that they send to the service (e.g., at Server A 117). If the epoch number for the service changes, then the service will detect a mismatch between the expected epoch number sent by client 99 and the server epoch stored at Server A 117 (step 320), and will return a reply to the client 99 indicating this. Such mismatch detection can occur at other times as well, such as during the connection step 305.

The client 99 can use this epoch mismatch reply for a variety of purposes (step 330). The most common is to treat it as a signal to collect a new Level 1 Service Point Map, or a new SPM for the level of map that contains the service that has changed. The client 99 may also discard any service-related state, or re-run operations that are part of a series.

One benefit of the epoch number concept is that clients can respond to communication failures by attempting to re-connect. This communications issue is thus decoupled from the issue of logical correctness in managing distributed state information.

Another use of the epoch number feature is to build a client plugin that interprets the epoch mismatch reply as a prompt to reload client-process-based load balancing algorithms. These can be implemented as plugins, and the service can dynamically choose which one is needed and designate it in the "service specific code" portion of the epoch mismatch reply. The service's client plugin can then load the new load balancing plugin from local storage or a remote location over the Internet 80 and automatically perform the requested function.

As services 111, 113, 115, 117, for example, are brought on line within the system, they notify an SPM manager machine 109 as to the physical location of such services within the network. This aspect is important where these services 109, 111, 113, 115, 117 are free to move across various server machines. In one embodiment, the service and location-specific information (such as network address location, network port number and service identifier) for each service is supplied to the SPM manager. This information is then compiled by generator 108 into a service point map 110 which indicates the current status of various services and which is distributed to the subscriber spheres on a regular basis or some other predetermined fashion such as described herein. This same generator may make more selective determinations about which services are included in a particular SPM by using the various partitioning schemes and load balancing techniques discussed herein and otherwise disclosed to those skilled in the art from the teaching of the present disclosures.

Figure 5:
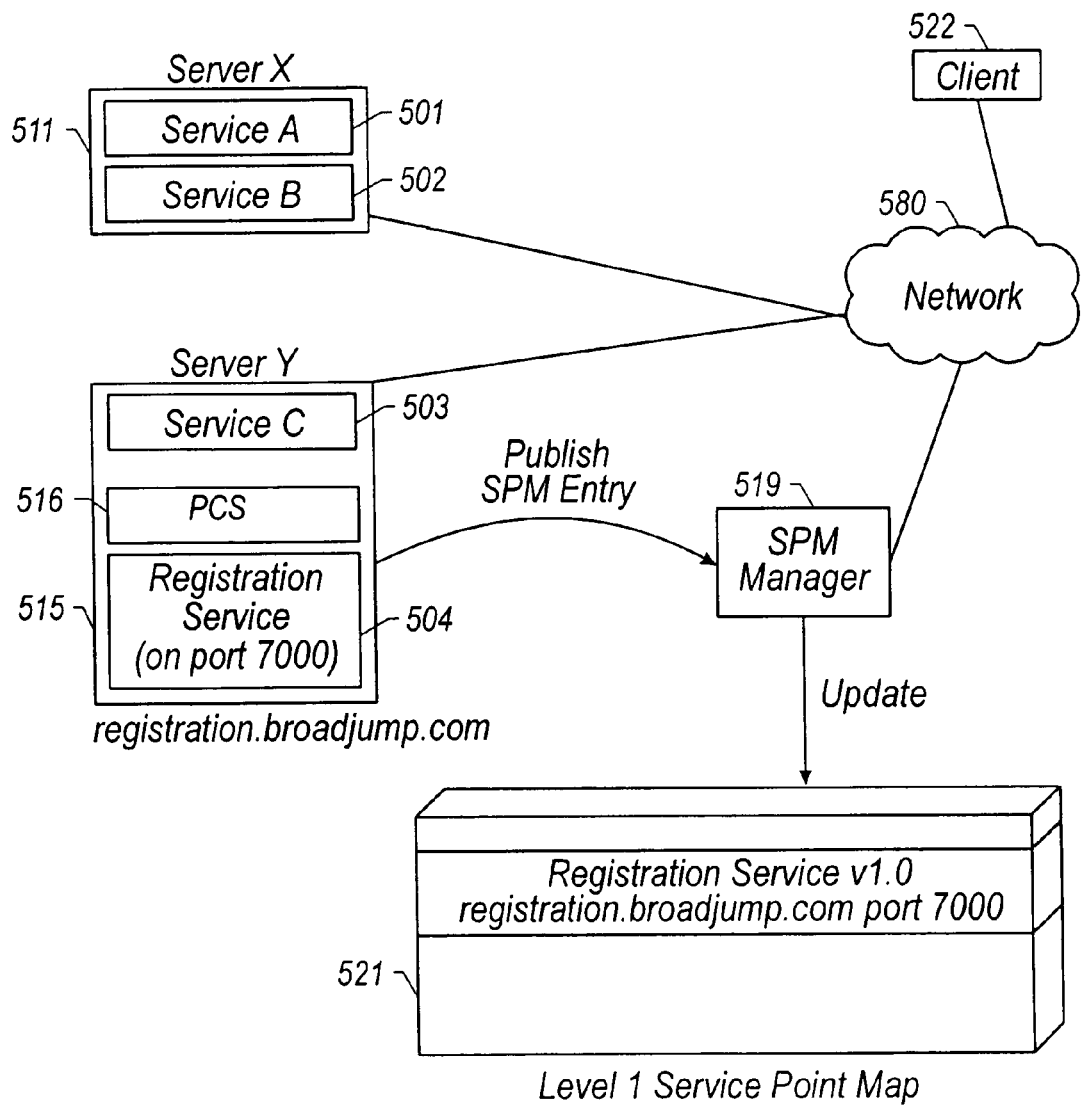
FIG. 5 shows the generation of a service point map with an exemplary server computer according to one embodiment of the present invention.

In accordance with the present invention, FIG. 5 illustrates an exemplary generation of the dynamic SPM of the present invention from the "perspective" of a service provided to the ESB by server 515. The service addressing information used to identify location information for services on the ESB is the SPM 521. Each process in any connected sphere (e.g., 511, 515) that implements a service has an entry in the SPM 521. The base ESB services have entries in the "Level 1" or "Top Level" SPM. In this embodiment, the SPM 521 is hosted and maintained by the SPM manager service (server 519) which is the entry point into the ESB for most join operations, all base service joins and any non-first-time client joins.

A service resident at server 515 (e.g., a registration service 504) begins operations when the process control server (PCS) 516 on the machine 515 becomes aware that it is supposed to start a server that implements that service. The PCS 516 uses the appropriate OS dependent functions to start the registration service 504, in this example. Each service constructs a Service Point Map entry for itself during this initialization. The SPM entry contains the service name, version number, and connection information for the specific instance, or server. Although a variety of ways exist for defining the service location, in one embodiment, the connection information includes a DNS name chosen from a set of "well-known" names and a port number on the service machine 515 that falls within a limited range 110 of numbers. For example, the SPM entry for the registration service 504 would be "Registration Service v1.0, registration.broadjump.com, port 7000."

As shown in FIG. 5, the SPM entry is submitted to the SPM manager service 519 for storage in the SPM 521. It will be appreciated that submission of the SPM entry can occur through any of a variety of "publication" techniques, including direct or indirect (i.e., via Internet) techniques. At this time, the registration service is said to be "active," implying that it is available to service requests.

In order to keep the SPM 521 up to date, when a server shuts down, it notifies the SPM manager service 519 with a list of the SPM entries that it has had active, and the SPM manager service 519 removes them from the Level 1 SPM 521.

In the event that the service 504 is transferred to another location, the original server 515 may be maintained as an available site for the service until all clients have migrated (under control of the dynamic SPM) to the new location. Alternatively, the client's inability to connect to a discontinued service location will serve as a prompt to try a failover address in the SPM, or to retrieve a new SPM from the designated source of current SPMs.

In accordance with the present invention, the SPM manager 519 collects the information from all active services 501, 502, 503, 504 or alternatively each service "publishes" the required service location and identification information to the SPM manager 519 upon connecting to the network. However collected, the SPM manager 519 uses the information to generate an SPM 521 for the network. This SPM may be copied to other services as required. For example, in the embodiment described above wherein a login service and registration service are used for establishing client connection to the ESB, a copy of the SPM 110 is copied to the login service at server 113.

In an alternate embodiment, the service point map 521 may also contain information that categorizes the sphere of influence for a service 515. This allows parallel or even duplicate services to exist within a single network but be logically separated and therefore partitioned for discrete use. This also allows for segmentation of services across arbitrary boundaries. A single SPM 521 may specify services that exist across disparate and perhaps geographically separate networks, but be aggregated into what appears to be a homogeneous service offering.

In addition to the service identification and location information, each service 501, 502, 503, 504 may also provide epoch value information for the current service which is used to synchronize the client's expected level of service with a dynamic service offering within a given service. As the current service mapping changes (i.e., as a service is moved or updated), the SPM manager 519 is made aware of these changes by the services themselves which "publish" the epoch value for the changed service to the SPM manager 519. Alternatively, the new epoch value is "published" or otherwise made available to the client 522 that requests such service. Where the client 522 has previously stored the then-current epoch value for a particular service, this is the expected epoch value for a service within that client 522. Clients include the expected epoch value in the request that they send to a specific service. A mismatch between the expected epoch value and the current epoch value will be sensed and serves as a stimulus for altered client behavior. This behavior is arbitrary but could be as simple as the indication that the service network topology has changed and the client should request an updated version of the SPM.

Multiple forms of the SPM are defined and may be used to add efficiency to the process of grouping services within different levels of skill. Beneath the level 1 SPM, there may logically exist an arbitrary number of sublevels that contain groupings of like services. The client may access the service by specifying one of these individual service machines according to a rule-based method. This allows for rule-based load balancing or data distribution algorithms to be defined and accomplished without an associated processing overhead by the service machines.

Referring again to FIG. 4, a further aspect of the dynamic service point map of the present invention is illustrated. Not only is the service map listing of service location information useful for efficient dissemination of network data to subscriber spheres, but it may also be used to dynamically allocate network resources to the subscribers. This can be especially important where services available to the network reside at multiple server sites. Take, for example, the situation shown in FIG. 4 where Server 1 420 is hosting Service 1, Server 2 430 is hosting Services 1, 2 and 3 and Server 3 440 is hosting Services 1 and 4. To accommodate the situation where Server 2 430 is heavily loaded in meeting the requirements of Services 2 and 3, the present invention allows the services to be allocated to the clients under control of the SPM so that Service 1 is listed in the SPM as being available only at Server 1 420, Service 2 and 3 are listed in the SPM as being available at Server 2 430, and Service 4 is listed in the SPM as being available at Server 3 440. As will be appreciated, this allocation can be made under control of the server machines 420, 430, 440 and advertised to the SPM manager. Alternatively, the allocation of services to servers can also be made under control of an SPM Manager, such as login service 413. Moreover, the present invention also allows for backup contingencies to be included in the SPM to address connection failures. In the example of FIG. 4, the SPM distributed to a client could identify Server 1 420 as the site for Service 1, but could also list Server 3 440 as a first backup location for Service 1, and Server 2 430 as a second backup location for Service 1.

The present invention permits the end points to control the topology of the distributed services network by distributing services to another server (a destination server) under control of the originating server. In one embodiment, a heavily loaded originating server (e.g., 44) distributes at least one of its services to another (destination) server (e.g., 420) using a predetermined sequence on the PCS to make a new clone of the service(s) to be distributed on the destination server. In distributed network environments where large numbers of client processes may be connected at any one time, the present invention allows services to be strategically partitioned or distributed under control of the SPM manager to provide scalability to the overall architecture of the network. Although the present invention includes "blind" generation and distribution of service point maps to clients (i.e., all SPM entries received from the services are included in the SPM that is distributed to the subscriber machines), the present invention also encompasses intelligent generation of service point maps whereby only selected available services are included on a map at any given time. For example, available services may be dimensionally partitioned in connection with the service point mapping scheme of the present invention, where dimensional partitioning refers to the separation of operational tasks into as many discrete and independent code paths as is practically possible. Several such partitioning methods exist which allow services to be implemented on separate servers, allows multiple services to be implemented on a single server, or allow more than one server to provide a service.

For example, "functional partitioning" may be used to divide a task into discrete functions, and then separates the functions into independent services. This is a powerful technique that can handle many of the common service needs because of difficulties with separating functions, it is sometimes not possible to use this technique for data management operations. In this class of problem, it is necessary to query and update data within the context of a transaction that maintains ACID (Atomicity, Consistency, Isolation and Durability) properties familiar in the on-line transaction processing world.

Functional partitioning techniques can be used for data management if, for example, there is a "create" operation that is distinct from "update" operations. As such an example, data that is created more or less constantly but updated only rarely can be jointly managed by two services, one that provides a high-speed create function and one that provides the necessarily slower update function. The update service must be able to allow for the fact that the data is changing while the update takes place. This is possible mainly through careful database design whereby the "update" operation is allowed to modify any-but-the-last record, while the "create" operation always adds as the last record. All records eventually become updateable, but the "create" process is never blocked waiting for the "update" process.

It is also possible to accomplish some functional partitioning in data management operations by separating out "query only" operations that can tolerate some delay in presenting the results of updates. For example, some classes of updates to a database can be queued for execution as a low priority task in order to devote maximum resources to delivering high-speed query access. In this model, the queued data must be recoverable in order to tolerate service outages during the delay between en-queuing and actual update. There may also be a need to retry a failed lookup query operation in a way that includes recently updated data.

Sometimes it is not possible to partition access to data via functional partitioning. This is often true, for example, in an application that allows users to purchase an item from a limited pool of such items, such as a physical inventory or a "first fifty to subscribe" pool. It is also true of mundane database operations such as updating a user profile, since the update might modify any item in the database.

In some of these cases it is possible to provide the service in multiple server instances by making each server responsible for only a limited subset of the data, and then to direct the client to the appropriate server based on some key data in the request.

Such partitioning by data dependent routing may be used in a data update operation where the data items are all tied to the primary key "Client-ID" that uniquely identifies subscribers. As a simple example of how data dependent routing works, consider a profile update service implemented by two server processes to update profile information about service subscribers. Server "A" is responsible for entries that contain a Client-ID that ends in a number evenly divisible by two, and server "B" is responsible for the other half of all entries. When a client attempts to update an entry, it first checks the Client-ID field of the data it is reading or writing and performs the arithmetic required in order to determine which server is responsible. It then selects a server from the current SPM based on this rule.

Where it is possible to predict some correlation between a service and its clients due to some third element that constitutes a shared resource, the resource connection may be used as a basis for partitioning. For example, this type of partitioning is used for a connection status monitoring service which monitors all processes that have connected to the ESB to detect cases where a process is no longer reachable but it still appears on the bus. This service does this partly by sending probe messages to the target client processes. Each target process runs on some machine in some sphere, and each machine has a position in the network topology.

The connection status service is partitioned into servers, each of which is responsible for part of the topology and for the processes running on machines which share that part of the topology. The SPM sent to subscribers in that part of topology includes identification and location information for the server in that part of the topology that provides the connection status monitoring service. This has benefits in limiting the load of the probes to the relevant part of the topology, and in increasing the total load capacity through partitioning.

Another example where resource connection partitioning is useful occurs where the client interaction with a group of servers follows a pattern where the client executes a series of service requests in a defined order before it reaches the result it needs. Finding a service through some sort of lookup operation is a typical example. It is often possible to partition the service that is first in that order as the resource connection, and to get the benefits of resource connection based partitioning in the subsequent calls. In other words, if each "lookup" server is associated with an independent set of the other services, then one of these service sets will be chosen implicitly when the lookup server is chosen. Again, this partitioning may be implemented under control of the SPM distributed to the subscriber machine.

As another example, if the Login service is using a resource connection based partitioning scheme, then the SPM returned will include only services in the partition connected to the Login service that the client contacts.

In some cases, a service may be of a type such that any server will do for any client request. This is called equivalence partitioning. An example of this is the registration service that provides Client-IDs for newly registered clients. The service creates an ID that is guaranteed to be unique across both time and space. This server can be replicated as broadly as necessary. Another example occurs where multiple login servers may be defined, each with their own equivalent services and SPM. This allows the login service and the services it lists to be partitioned by resource connection. In addition, multiple login servers may share a single SPM, thereby permitting equivalency partitioning of the Login service.

In accordance with the mapping scheme of the present invention, services can cause the clients to bring their state into compliance with the services' needs. This includes coordination of such factors as the versions of the service interface, form of the distribution architecture, algorithms for load balancing, failover mechanisms to identify alternate service locations in the event a primary service location fails (such as an alternative location for the service, or the SPM manager location for an updated SPM), etc. It is a flexible but efficient way for the client to be informed as to when it is necessary for it to modify any detail of its interaction with any given service, and how to accomplish the change.

Yet another potential application of the present invention is to transparently re-route the service requests in the event of any downtime at the service provider. Rather than requiring update information to inform each subscriber of the unavailability of a particular service, the present invention seamlessly re-routes the subscribers to an alternate service source on a demand basis by distributing SPMs with a new location for the particular service to the affected clients. Once the unavailable service location is up and running, the SPM manager is notified and future SPMs include the address information for the original service provider.

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

We claim:

1. A communication network, comprising:
   a plurality of server devices for providing a plurality of services, respectively, to the network, where each service of the plurality of services has a corresponding service address, and wherein the plurality of services are distinct from each other;
   a client device configured to access a first service of the plurality of services by performing at least the following:

accessing a service point map on the client device to obtain a first service address for the first service, and sending a request for the first service wherein the request comprises the first address for the first service, wherein the service point map comprises a listing of the plurality of services and their corresponding service addresses, including the first service address;

a service point map manager for generating a new service point map after the corresponding service address for the first service is changed from the first service address to a second service address, wherein the new service point map comprises the second service address;

wherein the service point map comprises a client epoch value;

wherein a third service has a corresponding service epoch value, whereby the third service causes the client device to take corrective action at the time that a mismatch is detected between the client epoch value and the service epoch value using executable commands embedded in the service point map.

2. The communication network of claim 1 wherein the service point map manager is configured to send the new service point map to the client device.

3. The communication network of claim 2, wherein the service point map manager device selects at least one connected service for inclusion in the new service point map using server load balancing techniques.

4. The communication network of claim 3, wherein the server load balancing techniques are implemented by supplying a first service point map to the client device, wherein the first service point map has been processed for load balancing.

5. The communication network of claim 3, wherein the server load balancing techniques are implemented by supplying a first service point map to the client device, wherein the client device runs a script code in the first service point map to select the at least one connected service.

6. The communication network of claim 2, wherein the service point map manager device selects at least one connected service for inclusion in the new service point map based on the topographical location of the client device in the network.

7. The communication network of claim 1, wherein the client epoch value is for a second service identified in the service point map, wherein the client epoch value is used to correlate the performance of the client device and the second service.

8. The communication network of claim 1, wherein a second service of the plurality of services causes the client device to perform actions using executable commands in the service point map.

9. The communication network of claim 1, wherein the service point map includes backup service address information for a selected service identified in the service point map in the event that the selected service cannot be reached.

10. The communication network of claim 9, wherein the backup service address information comprises address information for a service point map manager device.

11. The communication network of claim 9, wherein the backup service address information comprises address information for an alternate server device providing the selected service.

12. In a client/server communication network wherein a plurality of services are located on a plurality of servers operable to connect to the network, a server computer system for:

generating a table listing comprising identities of first and second services provided by first and second servers, respectively, of the plurality of servers and first and second location information for the first and second services, respectively, wherein the first and second location information are distinct from each other, and wherein the first and second services are distinct from each other;

sending the table listing to a client computer system for storage therein, wherein the table listing enables the client computer system to access the second service using the second location information in the table listing for the second service;

generating a new table listing after the second location information for the second service is changed to a third location information, wherein the new table listing comprises the identities of the first and second services and first and third location information for the first and second services, respectively, wherein the second and third location information are distinct from each other;

wherein the table listing is sent to the client computer system along with a client epoch value;

wherein a third service has a corresponding service epoch value, whereby the third service causes the client computer system to take corrective action at the time that a mismatch is detected between the client epoch value and the service epoch value using executable commands embedded in a service point map.

13. The server computer system of claim 12, wherein the server computer system generates the table listing based on service topology existing at the time the table listing was generated.

14. The server computer system of claim 12, wherein the server computer system sends the table listing to client computer system when the client computer system connects to the network.

15. The server computer system of claim 12, wherein the first service is selected from the plurality of services using a first partitioning scheme, wherein the first partitioning scheme is a functional partitioning of the plurality of services.

16. The server computer system of claim 12, wherein the first service is selected from the plurality of services using a first partitioning scheme, wherein the first partitioning scheme uses identification data associated with the client computer system to select the first service.

17. The server computer system of claim 12, wherein the first service is selected from the plurality of services using a first partitioning scheme, wherein the first partitioning scheme is uses a resource connection to select the first service.

18. The server computer system of claim 12, wherein the first service is selected from the plurality of services using a first partitioning scheme, wherein the first partitioning scheme uses equivalency to select the first service.

19. A method comprising:
in a first server of a plurality of servers transferring a dynamic service point map to a client in response to the client connecting to a computer network;

wherein the dynamic service point map comprises identities of first and second services along with first and second location information, respectively, wherein the first and second services are provided by first and second servers, respectively, and wherein the first and second services are distinct from each other;

creating a new dynamic service point map by changing the second location information for the second service to a third location information in the dynamic service point map in response to adding the second service to a third server;

the first server transferring the new dynamic service point map to the client;

wherein the new dynamic service point map comprises identities of first and second services along with first and third location information, respectively, wherein the second and third location information are distinct from each other;

wherein the service point map comprises a client epoch value;

wherein a third service has a corresponding service epoch value, whereby the third service causes the client to take corrective action at the time that a mismatch is detected between the client epoch value and the service epoch value using executable commands embedded in the service point map.

20. The method of claim 19 further comprising:
the first server receiving the second location information for inclusion in the dynamic service point map.

21. The method of claim 19 further comprising transferring the new service point map to the client upon failure of the client to connect to the second service listed in the dynamic service point map.

22. A computer-readable medium comprising:
transferring instructions to transfer a dynamic service point map to a client process running on a client from a first server of a plurality of servers in a network in response to the client process connecting to the network, wherein the dynamic service point map comprises first and second location information corresponding to the first and second services, respectively, implemented on first and second servers, respectively, and wherein the first and second services are distinct from each other;

transferring instructions to transfer a new dynamic service point map to the client process running on the client after the second location information for the second service is changed to a third location information;

wherein the new dynamic service point map comprises identities of first and second services along with first and third location information, respectively, wherein the second and third location information are distinct from each other;

wherein the new dynamic service point map comprises a client epoch value;

wherein a third service has a corresponding service epoch value, whereby the third service causes the client process to take corrective action at the time that a mismatch is detected between the client epoch value and the service epoch value using executable commands embedded in the new dynamic service point map.

23. The computer-readable medium of claim 22 further comprising:
generating instructions to generate the second location information, and publishing instructions to publish the second location information for inclusion in the dynamic service point map.

24. The computer-readable medium of claim 22 further comprising:
second transferring instructions to transfer the new dynamic service point map to the client process upon failure of the client process to connect to second service listed in the dynamic service point map.

* * * * *